No. 787,536. PATENTED APR. 18, 1905.
C. A. McINTOSH.
TRACTION WHEEL.
APPLICATION FILED DEC. 12, 1904.

2 SHEETS—SHEET 2.

Witnesses
C. Menster
C. H. Griesbauer

Inventor
Clayton A. McIntosh
by H. R. Willson
Attorney

No. 787,536. Patented April 18, 1905.

UNITED STATES PATENT OFFICE.

CLAYTON A. McINTOSH, OF WASHINGTON, KANSAS, ASSIGNOR OF ONE-HALF TO BOND SHAFER, OF WASHINGTON, KANSAS.

TRACTION-WHEEL.

SPECIFICATION forming part of Letters Patent No. 787,536, dated April 18, 1905.

Application filed December 12, 1904. Serial No. 236,562.

*To all whom it may concern:*

Be it known that I, CLAYTON A. MCINTOSH, a citizen of the United States, residing at Washington, in the county of Washington and State of Kansas, have invented certain new and useful Improvements in Traction-Wheels; and I do declare the following to be a full, clear, and exact description of the invention, such as will enable others skilled in the art to which it appertains to make and use the same.

This invention relates to improvements in traction-wheels for traction-engines, automobiles, and other vehicles.

The object of the invention is to provide a wheel of this character having means whereby the same will be caused to take a firm hold on the surface over which the wheel may be passing, thus enabling the vehicle on which the wheel is mounted to travel over muddy or sandy roads and over snow or ice.

A further object is to provide means whereby the holding or gripping devices carried by the wheel may be caused to project deeply into the ground or only to a slight distance.

With the above and other objects in view the invention consists of certain novel features of construction, combination, and arrangement of parts, as will be hereinafter described and claimed.

Figure 1:
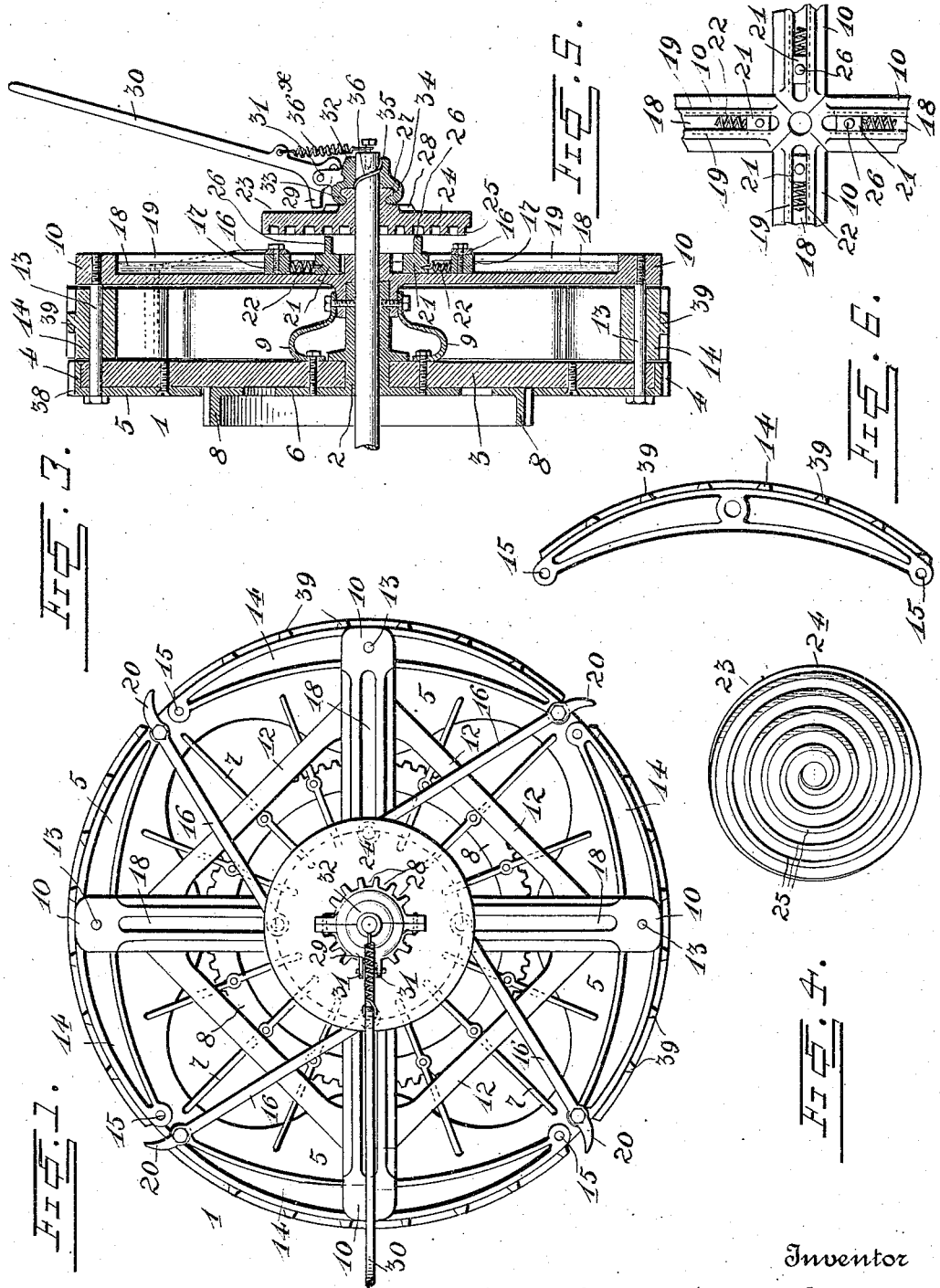
Figure 2:
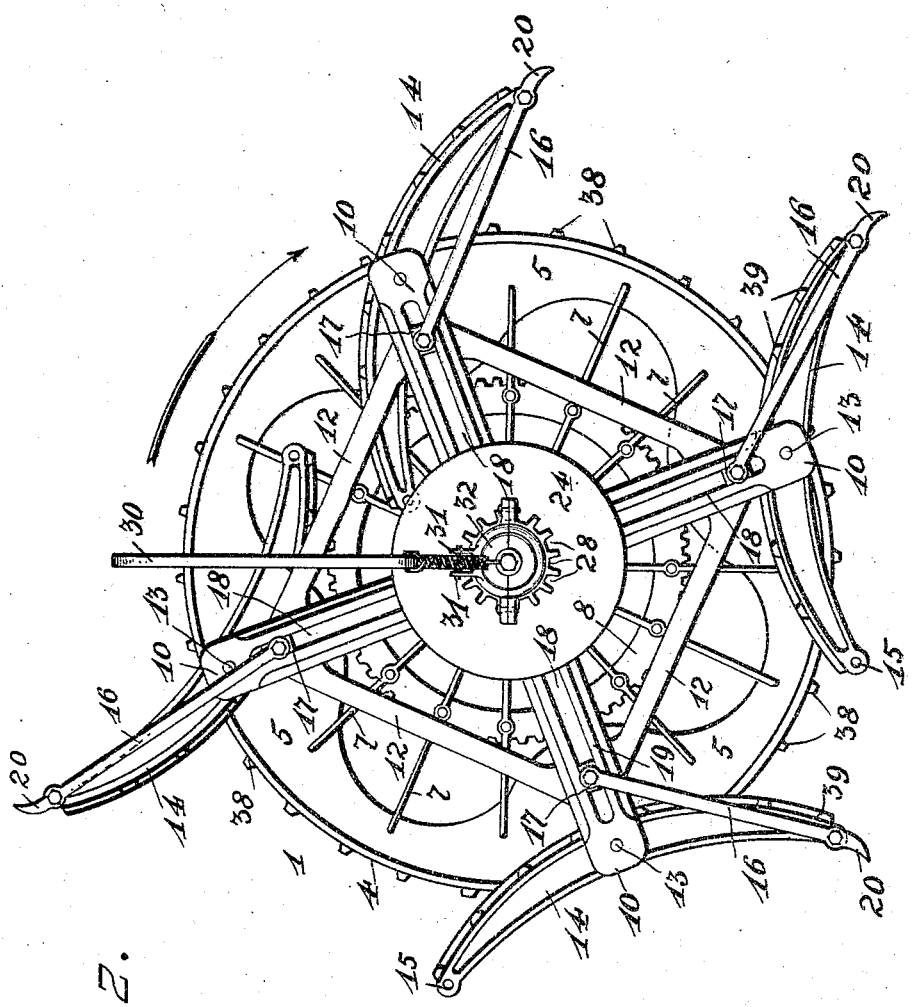

In the accompanying drawings, Figure 1 is a side elevation of a wheel constructed in accordance with the invention and showing the gripping or holding devices in folded position. Fig. 2 is a similar view of the gripping devices extended or in operative position. Fig. 3 is a vertical sectional view of the same. Fig. 4 is an inner face view of the threaded stop-adjusting plate for limiting the inward movement of the gripping devices. Fig. 5 is a detail side view of the inner end of the channel-spokes, showing the arrangement of the adjustable cushioning stop-locks for limiting the inward movement of the gripping devices. Fig. 6 is a detail side view of one of the gripping devices or steppers.

Referring more particularly to the drawings, 1 denotes the wheel, consisting of a centrally-disposed hub 2, on one end of which are mounted four main supporting-spokes 3. These spokes are arranged at diametrically opposite points and are connected at their outer ends by means of a rim or tire 4, on the outer edge of which is formed an inwardly-projecting flange or web 5. The hub 2 is provided on one end with an annular flange 6, between which and the flange or web 5 is arranged a series of auxiliary spokes 7. To the spokes 3 and 7 is bolted a circular tooth rack or gear 8, with which is adapted to be connected driving mechanism by which the vehicle is propelled. The outer ends of the spokes 3 are bolted to the flange 5, while the inner ends of the same are bolted to the flange 6 of the hub 2, said inner ends of the spokes being further connected to the hub by means of curved brace-bars 9. Connected to the opposite end of the hub 2 at diametrically opposite points are grooved or channeled spokes 10, said spokes lying directly opposite and parallel to the spokes 3 on the opposite side of the hub. The spokes 10 are connected together and braced near their outer ends by inclined brace-bars 12.

Pivotally mounted between the outer ends of the spokes 3 and 10 upon short shafts 13 are segment-shaped steppers 14, in the outer ends of which are formed transversely-disposed eyes or apertures 15. With one of said apertured ends of the steppers 14 is pivotally connected the outer end of a pitman-rod 16, the opposite or inner end of which is pivotally connected to a block 17. Said block 17 is slidably mounted in a channel or groove 18, formed in the outer face of the spokes 10, the walls of said groove having inwardly-projecting flanges 19, which prevent the block 17 from becoming detached from said spokes. The block 17 is loosely mounted in the channel or groove 18, thereby being permitted to have a free sliding movement therein. On the outer ends of the pitman-rods 16 are formed curved transversely-disposed plates 20, which extend across the face of the steppers, and when the steppers are in operative position will engage the ground over which the wheel is passing, causing said steppers to take a firm grip on said ground.

As the wheel turns forwardly, as indicated by the arrow in Fig. 2, the steppers 14 will drop by gravity to the proper position to engage the ground, thereby preventing the wheel from slipping. As the grippers drop into their various positions during the turning of the wheel the sliding block 17 will be projected back and forth through the groove 18 in the spokes 10 by the shifting rods 16.

In order that the movement of the steppers may be controlled to accommodate the same to various conditions of the ground over which the wheel is passing, suitable stop-blocks 21 are provided, said blocks being adjustably mounted in the grooves or channels 18 of the spokes 10, and they are provided with coil-springs 22, against which the blocks 17 are adapted to abut. This arrangement forms a cushion by which the jar of the two blocks coming together will be cushioned or relieved.

In order that the blocks 21 may be adjusted in the channels or grooves of the spokes 10 to regulate the movement of the blocks 17, suitable adjustable mechanism 23 is provided. The adjusting mechanism 23 consists of a plate or disk 24, which is loosely mounted upon the projecting end of the shaft or axle of the machine, said plate or disk being provided on its inner face with a spirally-arranged thread 25, with which are adapted to be engaged pins 26, formed on and projecting laterally from the blocks 21. The disk 24 being loosely mounted upon the shaft or axle will normally turn with the wheel and will thus hold the blocks in position. Should it be desired to shift the blocks 21 in the channels 18, the disk or plate 24 may be held against rotation, so that as the wheel continues to turn the pins 26 in the blocks 21 will be carried around in the spiral groove adjacent to the thread 25, and it will force said blocks outwardly or away from the center of the wheel, thereby limiting the distance in the slots 18 through which the blocks 17 on the pitman-rod 16 may move, thereby regulating the position of the steppers.

In order that the disk 24 may be held against rotation with the wheel 1, the outer face of the same is provided with a hub 27, on which is formed an annular series of notches 28, with one or the other of which is adapted to be engaged a lug 29. This lug 29 is formed on the lower end of a hand-lever 30, which is pivotally mounted in a bracket which is formed on a hub or collar 32, arranged on the outer end of the shaft or axle of the wheel. The hub or collar 32 is formed in two parts, which are adapted to be clamped upon the shaft, as shown. On the inner face of the hub or collar 32 is formed an inwardly-projecting annular flange 33, which is adapted to be engaged with an annular groove 34, formed on the outer end of the hub 27. On the inner wall of the hub or collar 32 is formed a spirally-arranged groove 35, which is adapted to engage a spirally-arranged thread 36, formed on the end of the axle or shaft of the wheel.

When it is desired to shift the blocks 21 in the groove or channel 18, the lever 30 is pulled inwardly toward the side of the wheel, thereby engaging the lug 29 with the notches 28, thus holding said plate or disk 24 against rotation. The wheel 1 will continue to rotate, thus carrying the blocks 21 around, and as the pins 26 formed thereon project into the spirally-arranged groove adjacent to the thread 25 in the disk 24 said blocks will be moved toward the outer edge of said plate or disk and nearer to the outer end of the grooves or channels 18, thereby closing said channels a portion of their distance and shortening the path of movement of the blocks 17, which will consequently limit the movement of the steppers through the pitman-rods 16. After the blocks have been thus moved outwardly to the desired distance the lever 30 is released and will be swung outwardly to its normal position by means of a spring $36^{\times}$, which is connected thereto and to the end of the shaft or axle, thus disengaging the lug 29 from the notches 28, which will permit the plate or disk 24 to again turn with the wheel 1, the blocks 21 being held in their adjusted position by said plate.

When it is desired to restore the blocks 21 to their normal position or out of the way of the blocks 17, the lever 30 will be grasped and turned ninety degrees around the shaft or axle of the wheel in a plane perpendicular to the axle to the position shown in Fig. 1 of the drawings. By thus turning the lever the hub or collar 32 is also turned around said shaft or axle, the spiral thread 36 on said axle engaging the groove 35 in the inner wall of said hub, thereby causing said hub to be shifted outwardly on the axle, and owing to the pivotal connection between the hub 32 and the hub of the plate 24 said plate will be also shifted outwardly on the shaft or axle, thus disengaging the groove in the same from the pins 26 in the blocks 21, which will permit said blocks to drop or to be pushed back to the inner end of the slots 18, thereby clearing the way for the blocks 17. These blocks 17 may now move inwardly a sufficient distance to permit the steppers to loosely engage the surface of the ground, so that the same are not forced into said ground as the wheel is revolved.

On the rim or tire 4 are formed transversely-disposed cleats 38, and on the convex surface of the steppers 14 are formed obliquely-disposed cleats 39, whereby when said steppers are folded inwardly to the position shown in Fig. 1, in which position the wheel is used as an ordinary traction-wheel, said cleats will serve to afford a firm gripping-surface for the wheel. When the steppers are arranged in the position shown in this figure, the blocks 17 on the inner ends of the pitman-rods may be locked to hold said steppers in position by screwing the pivot-bolt which connects the inner ends of the pitman-rods with the block through the latter and into engagement with the inner wall of the groove or channel 18, thus binding said block in said groove. When the steppers are in this position, the curved plates 20 on the ends of the pitman-rods will serve as mud-spurs.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. In a traction-wheel, the combination with a flanged hub, of radially-disposed main spokes secured to one end thereof, a flanged rim or tire arranged on said main spokes, auxiliary spokes arranged between said main spokes and connected to the flanges of said rim and hub, channeled spokes secured to the opposite end of said hub, and disposed opposite to and parallel with said main spokes, segmental steppers pivoted between the outer ends of said main and channeled spokes, guide-blocks slidably mounted in said channeled spokes, pitman-rods connecting one end of said steppers with said guide-blocks, and means whereby the inward movement of said blocks is limited, thereby regulating the inward movement of said steppers, substantially as described.

2. In a traction-wheel, the combination with a flanged hub, of radially-disposed parallel spokes secured to the opposite ends of said hub, a rim or tire arranged on the outer ends of the spokes on one end of said hub, longitudinally-disposed channels formed in the other set of spokes, segment-shaped steppers pivotally mounted between the outer ends of said spokes, guide-blocks slidably mounted in the channels of said spokes, pitman-rods connecting one end of said steppers to said guide-blocks, adjusting-blocks also mounted in said channels to limit the inward movement of said guide-blocks, and means whereby said adjusting-blocks are shifted and held at different positions in said channels, substantially as and for the purpose described.

3. In a traction-wheel, the combination with a flanged hub, of radially-disposed parallel spokes secured to the opposite ends of said hub, a rim or tire arranged on the outer ends of the spokes on one end of said hub, longitudinally-disposed channels formed in the other set of spokes, segment-shaped steppers pivotally mounted between the outer ends of said spokes, guide-blocks slidably mounted in the channels of said spokes, pitman-rods connecting one end of said steppers to said guide-blocks, adjusting-blocks also mounted in said channels to limit the inward movement of said guide-blocks, an adjusting plate or disk loosely mounted on the end of the axle of said wheel, a spiral thread formed on the inner face of said plate or disk, a laterally-projecting pin formed on said adjusting-blocks to engage said spiral thread, means whereby said disk or plate is turned thereby moving said block outward in said channels and means whereby said plate may be shifted into and out of engagement with said pin, substantially as described.

4. In a traction-wheel, the combination with a flanged hub, of radially-disposed parallel spokes secured to the opposite ends of said hub, a rim or tire arranged on the outer ends of the spokes on one end of said hub, longitudinally-disposed channels formed in the other set of spokes, segment-shaped steppers pivotally mounted between the outer ends of said spokes, guide-blocks slidably mounted in the channels of said spokes, pitman-rods connecting one end of said steppers to said guide-blocks, cushioned adjusting-blocks also mounted in said channels to limit the inward movement of said guide-blocks, an adjusting plate or disk loosely mounted on the end of the axle of said wheel to normally turn with said wheel, a spiral thread formed on the inner face of said plate or disk, a pin formed on said adjusting-blocks to normally engage said thread, an annular series of notches formed on the outer face of said disk, a pivotally-mounted lever, adapted to be swung into and out of engagement with said notches whereby said disk or plate will be held against revolution, and means whereby said plate or disk is disengaged from the pins on said adjusting-blocks, substantially as described.

5. In a traction-wheel, the combination with a flanged hub, of radially-disposed parallel spokes secured to the opposite ends of said hub, a rim or tire arranged on the outer ends of the spokes on one end of said hub, longitudinally-disposed channels formed in the other set of spokes, segment-shaped steppers pivotally mounted between the outer ends of said spokes, guide-blocks slidably mounted in the channels of said spokes, pitman-rods connecting one end of said steppers to said guide-blocks, cushioned adjusting-blocks also mounted in said channels to limit the inward movement of said guide-blocks, an adjusting plate or disk loosely mounted on the end of the axle of said wheel to normally turn with said wheel, a spiral groove or thread formed on the inner face of said plate or disk, a pin formed on said adjusting-blocks to normally engage said thread, an annular series of notches formed on the outer face of said disk, an annularly-grooved hub formed on said plate, a two-part collar mounted on the extreme end of said axle and loosely connected to the grooved hub of said plate, a spring-retracted lever pivotally mounted on said collar, a lug formed on said lever and adapted to be moved thereby into engagement with the notches on said plate or disk to hold said plate against rotation, and a spiral thread formed on the end of said axle to engage a spiral groove in said collar whereby when said lever is turned ninety degrees around said axle said collar and said plate or disk will be shifted out of engagement with the pins on said adjusting-blocks, substantially as and for the purpose described.

In testimony whereof I have hereunto set my hand in presence of two subscribing witnesses.

CLAYTON A. McINTOSH.

Witnesses:
 BOWEN R. SHAFFER,
 THOMAS C. BAKER.